United States Patent
Schilling et al.

(10) Patent No.: US 7,746,823 B2
(45) Date of Patent: Jun. 29, 2010

(54) REDUCED TIME PACKET TRANSMISSION IN A WIRELESS COMMUNICATIONS SYSTEM

(75) Inventors: Donald L. Schilling, Palm Beach Gardens, FL (US); Joseph Garodnick, Centerville, MA (US)

(73) Assignee: Linex Technologies, Inc., West Long Branch, NJ (US)

( * ) Notice: Subject to any disclaimer, the term of this patent is extended or adjusted under 35 U.S.C. 154(b) by 0 days.

(21) Appl. No.: 12/551,108

(22) Filed: Aug. 31, 2009

(65) Prior Publication Data

US 2009/0316644 A1 Dec. 24, 2009

Related U.S. Application Data

(62) Division of application No. 11/352,954, filed on Feb. 13, 2006.

(51) Int. Cl.
*H04W 4/00* (2009.01)

(52) U.S. Cl. .................. 370/328; 455/522; 370/344

(58) Field of Classification Search ................. 370/328, 370/344; 455/453, 573, 522
See application file for complete search history.

(56) References Cited

U.S. PATENT DOCUMENTS

2006/0281476 A1* 12/2006 Lane et al. ................. 455/502

* cited by examiner

*Primary Examiner*—Duc Nguyen
*Assistant Examiner*—Chuck Huynh

(57) ABSTRACT

System and method for reducing acquisition time of packets in a FDD system, such as a spread-spectrum or OFDM system. A remote unit transmits a multi-tone packet. The multi-tone packet has a plurality of tones with each tone having a different power level, and at a different frequency, from other tones in the plurality of tones. The base station receives the multi-tone packet. The base station compares the plurality of tones from the received multi-tone packet to a threshold or other selection criteria. A tone is selected from the plurality of tones meeting desired selection criteria. Based on the selected tone, the base station transmits a BS packet with the BS packet having power information from the power level of the selected tone.

25 Claims, 7 Drawing Sheets

RECEIVED TONES IN A NON-FADING ENVIRONMENT

RECEIVED TONES IN A FADING ENVIRONMENT

POWER ESTIMATE IN A FADING CHANNEL ENVIRONMENT

RECEIVED TONES IN A FADING ENVIRONMENT

POWER ESTIMATE IN A FADING
CHANNEL ENVIRONMENT

REDUCED TIME PACKET TRANSMISSION IN A WIRELESS COMMUNICATIONS SYSTEM

CROSS-REFERENCE TO RELATED PATENT APPLICATION

This application is a divisional of prior patent application Ser. No. 11/352,954 filed Feb. 13, 2006, the entire disclosure of which is incorporated herein by reference.

BACKGROUND OF THE INVENTION

The present invention relates to spread-spectrum and OFDM communications, and more particularly to a system and method to significantly decrease the acquisition time required for packet communications.

DESCRIPTION OF THE RELEVANT ART

In many communications systems, such as 3G cellular, WiFi, WiMax, etc., voice users share the system capacity with packet users. In such systems, the packet transmission from a remote user (RU) to a base station (BS) should be received at the base station with approximately the same power as any other remote unit's transmission. In standard frequency division duplex (FDD) Spread Spectrum and orthogonal frequency division multiplex (OFDM) systems, the steady state power level adjustment is performed using automatic, closed-loop, power control (APC). The purpose of APC is to monitor the power, or error rate, received at the base station from a remote unit and to tell the remote unit to either raise or lower its transmitted power level.

For a time division duplex (TDD) system, since the transmit and receive signals are on the same frequency, open loop power control can indicate the starting power for the remote unit. However, in a FDD system, since the downstream and upstream transmission paths are uncorrelated, the appropriate power level for the remote unit is unknown. Typically, when the remote unit starts transmitting, the remote unit transmits at a very low power level to ensure that the power transmitted, when received at the base station, is not significantly greater than the power received from each of the other remote units. Otherwise, other remote unit users will be jammed by this high power. This is called the near-far problem and is well known to practitioners in the field. This transmitted power is increased over time, until the base station acquires the signal and the APC begins to control the transmitted RU signal power. This process is called the "Ramp-Up", and the procedure is well known. The elapsed time is incidental, if voice, video, or any very long transmission is to occur. However, if the transmission were a single packet, say an Acknowledgment (ACK) packet, or any short packet, the elapsed ramp-up time, or acquisition time, could well exceed the packet duration.

SUMMARY OF THE INVENTION

A general object of the invention is to decrease the acquisition time required for a packet communication transmitted by a remote unit, by transmitting simultaneously, a multitude of tones, i.e. a multi-tone signal, where each tone is of different power. The base station receives those tones which exceed a specified threshold and estimates the power that should be transmitted by the remote unit. The base station notifies the remote unit of the correct power level and the "ramp-up" or starting point for the APC is complete.

The present invention provides a system and method for the initial power level adjustment, or initial power control, of packets in a FDD system, such as a spread-spectrum system, and an OFDM system. The power control system and method include a remote unit (RU) and a base station (BS). The remote unit transmits a multi-tone packet. The multi-tone packet has a plurality of tones with each tone having a different power level, and at a different frequency, from other tones in the plurality of tones. The base station receives the multi-tone packet from the remote unit. The base station compares the plurality of tones from the received multi-tone packet to a threshold or other selection criteria. A tone is selected from the plurality of tones meeting desired selection criteria. Based on the selected tone, the base station transmits a BS packet with the BS packet having power information from the power level of the selected tone.

The remote unit receives the BS packet, and sets a RU power level from the power information. The remote station then transmits one or a plurality of RU packets, with the RU power level. After the initial setting the remote RU power level can be controlled by other power control methods.

Additional objects and advantages of the invention are set forth in part in the description which follows, and in part are obvious from the description, or May be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention

DETAILED DESCRIPTION OF THE PREFERRED EMBODIMENTS

Figure 1:
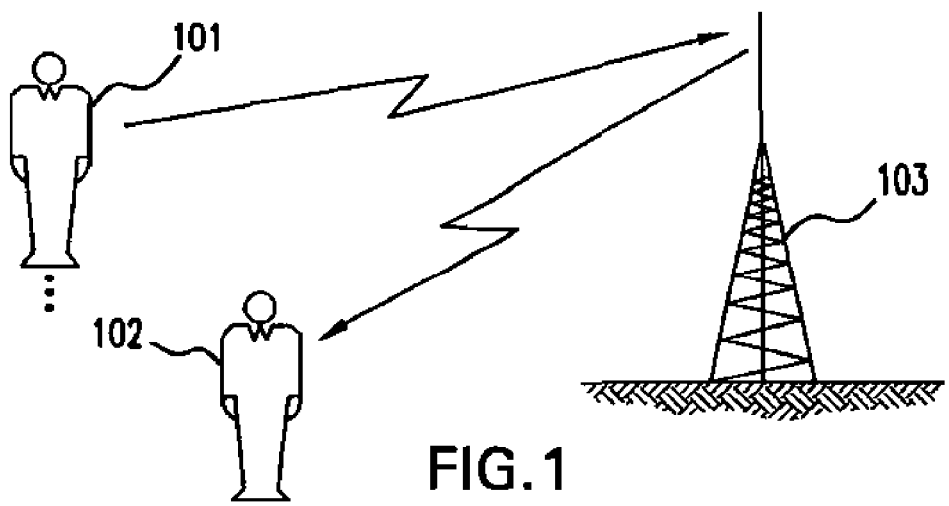
FIG. 1 shows remote users communicating with a base station.

Reference now is made in detail to the present preferred embodiments of the invention, examples of which are illustrated in the accompanying drawings, wherein like reference numerals indicate like elements throughout the several views.

This invention describes a system and method for significantly decreasing the acquisition time required for a packet to be transmitted from a remote unit to a base station. The invention applies to star networks, mesh networks, and to all other multi-access network configurations. The base station could be a node or part of a node.

The standard approach, of ramping up the power level, from the remote unit, takes a significant amount of time because at least one packet symbol must be transmitted at each power level and an appropriate waiting time occurs, until the remote unit receives a response from the base station. In the case of a FDD system, such as spread spectrum or OFDM, one ramp-up symbol would be transmitted every transmit frame until the response was received by the remote unit. If there is a 30 dB range of power levels, and the remote unit steps the level by 3 dB for each step, of say, T seconds, then 10 steps may be required to recognize and acquire the signal, and therefore the time expended is 10 T.

Figure 2:
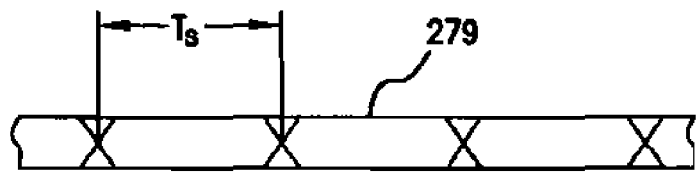
FIG. 2 shows a packet, which is sent from the remote unit to the base station, with the packet containing symbols, and the symbol time is Ts.
Figure 3:
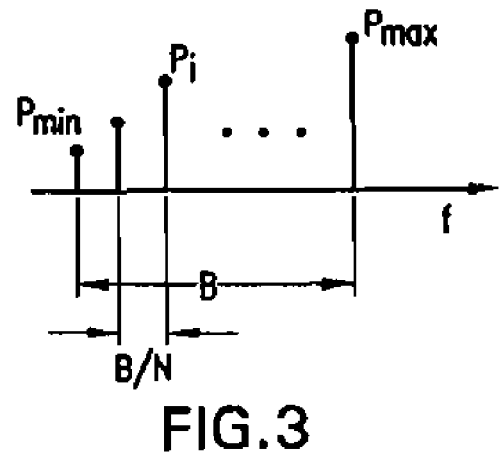
FIG. 3 shows the multi-tone frequencies Pmin to Pmax.

The present invention, as illustratively shown in FIG. 1, broadly provides the initial, or transient, power control, for use between a plurality of remote units 101, 102 and a base station 103. In FIG. 2, a particular remote unit 101, by way of example, transmits a multi-tone packet 279. The multi-tone packet 279 of FIG. 2 has a plurality of tones, Pmin, Pi, . . . , Pmax, as shown in FIG. 3, with each tone having a different power level. Each tone is at a different frequency, from the other tones in the plurality of tones. The order of the power level of the tones may be increasing versus frequency, as shown in FIG. 3, or other order. The spacing of tones could be uniform, but could be apportioned in different ways, depending on the environment, or other conditions. In FIG. 3, B is the bandwidth of the packet, and N is the number of tones in the packet.

Figure 4:
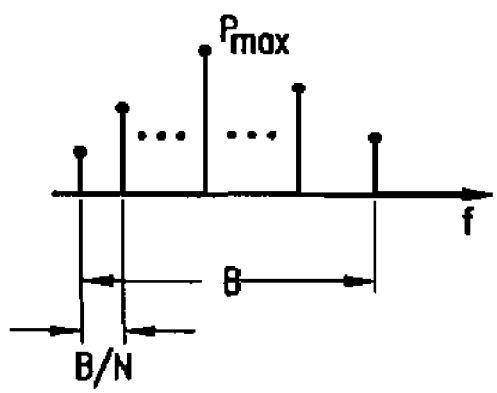
FIG. 4 shows the preferred embodiment where the tones at the edge of the band have the smallest power, so that filtering is more easily accomplished.

FIG. 4 is an example of tones having increasing and decreasing power levels versus frequency. In the preferred embodiment $Pi+1=Pi+3$ dB. In general, any power change will work. A power change of 6 dB will require the use of fewer tones, but will result in a poorer estimate. A 1 dB change will require many more tones. The designer, based on the environment, and other factors, might choose different separations of power levels. There is no requirement that the tone power differences, or frequency spacing be uniform in value. Indeed, these could be changeable by command of the base station.

A base station 103 receives the multi-tone packet transmitted from the remote unit 101, shown in FIG. 1. The base station 103 includes circuitry or equivalently, a processor and software or firmware, for comparing to a threshold, the plurality of tones from the received multi-tone packet of FIG. 2. The base station 103 selects a tone, from the plurality of tones, meeting desired selection criteria. Using the selected tone, the base station 103 transmits a BS packet. The BS packet has power information from the power level of the selected tone. The remote unit also can modulate the tones in a way that informs the base station which remote unit is asking for the power setting. Thus, the base station will know to whom to send the transmitter power setting. In addition, the modulated tones, may give the BS an indication of how far away the RU is, and can send time buffer and other information that may be needed in some OFDM and Spread Spectrum Systems.

The remote unit 101 receives the BS packet, and sets, responsive to the power information, a RU power level. The RU power level is the power level at which the remote unit 101 transmits. At the RU power level, the remote unit 101 transmits a plurality of packets with data.

Figure 5:
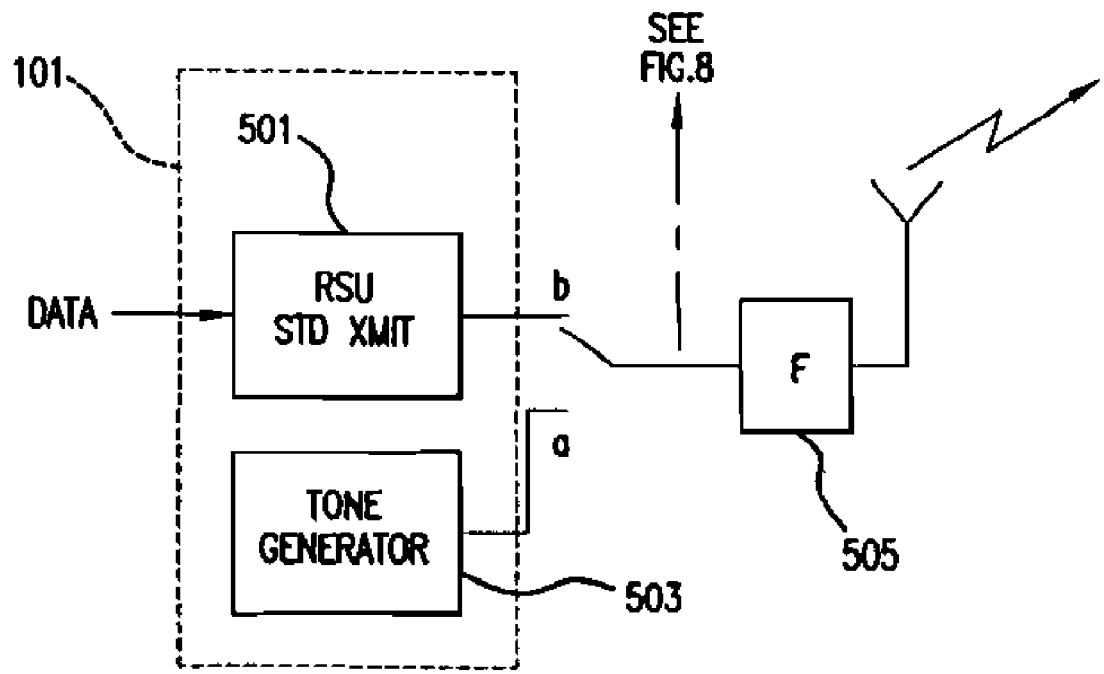
FIG. 5 shows that the remote unit first sends the multi-tone packet, and then after receiving the power level information from the base station, sends the information-bearing packet.

FIG. 5 illustrates conceptually, a remote unit with the improvements of the present invention. A tone generator generates the multi-tones for the multi-tone packet. Electronic circuitry switches to point a, for outputting the tones as a multi-tone packet. A filter 505 filters the signal, which is radiated by the antenna. After the power level is set for the remote unit, the electronic circuitry switches to b, which is the remote unit data transmitter 501. The remote unit then sends the data.

Figure 6:
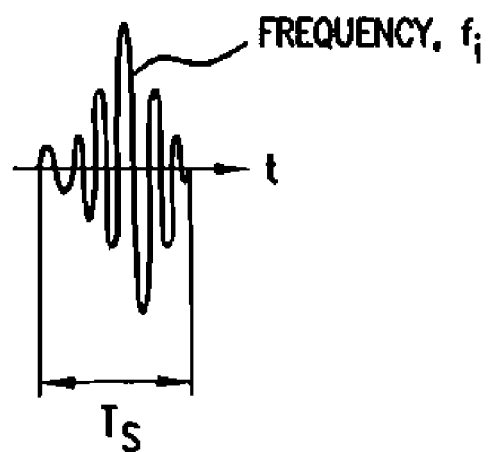
FIG. 6 shows that the tones may be filtered to reduce tonal splatter.

In this invention the remote unit 503 transmits, for the example, 10 tones, each with a different power level for each tone so that the power of each tone is: P, 2P, 4P, . . . , 1024P, as shown in FIG. 3 or 4. If the channel bandwidth is B, each tone, in the preferred embodiment, is spaced approximately, (B/10) Hz apart. Also, in the preferred embodiment, the lower power tones are at the outside of the bandwidth B, as shown in FIG. 4, while the tones having more power are toward the center of the bandwidth B. This is done to simplify filtering and minimize out-of-band interference. In an OFDM system, these tones can be the same frequencies as the pilot tones normally sent, except the power is not equal among the tones. FIG. 6 shows the typical waveform of each of the N tones, after filtering.

For this particular example, the base station 103 receives the 10 tones simultaneously and detects those tones with a sufficiently high power level. If, say, tone k were the tone closest to, but greater than, the proper power level to be received, then the base station 103 transmits to the remote unit 101, telling the remote unit 101 to use the power sent at frequency k. Thus, in a time Ts, acquisition is achieved.

Figure 7A:
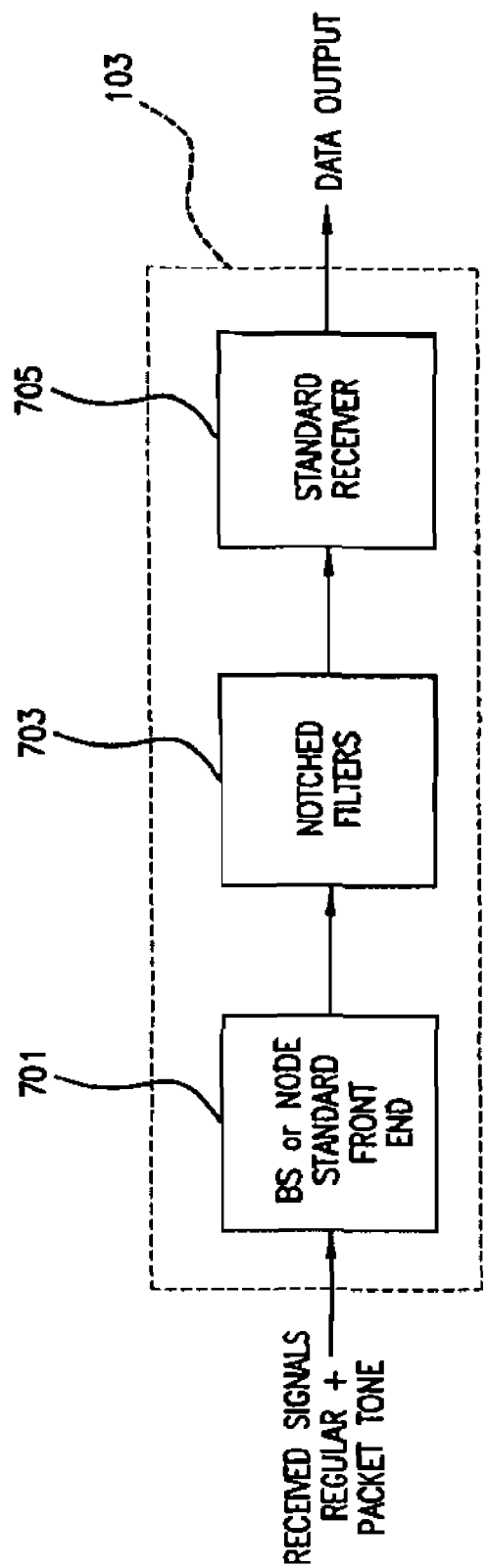
FIG. 7A is a block diagram of the receiver used to receive the information signals, showing notched filters used to reduce the tonal energy.
Figure 7B:
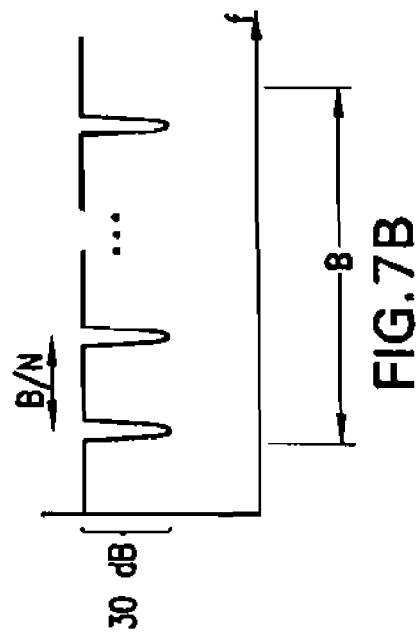
FIG. 7B shows the notched filters having a 30 dB depth and spacing of B/N.

The power transmitted by a spread-spectrum system to achieve synchronization in this multi-tone manner, must exceed the permitted power received by the base station 103, and therefore other voice users could be jammed. The receiver at the base station 103, shown in FIG. 7A, demodulates each of these voice users. The receiver employs a bank of notched filters 703, as shown in FIG. 7A, to filter out the power at each frequency of each tone. As shown in FIG. 7B, each notch needs to have a bandwidth, Bb, of approximately, $Bb=1/T$, and a notch depth of about 30 dB. The filters are spaced B/10 apart. The notch filters 703 can be placed after the normal receiver front end 701, and is followed by a standard receiver 705, which is used to receive the information bearing signal. There are typically, many of these receivers, one for each received information bearing signal. The design of receivers is well known in the art. Thus, for example, assume that the total power received by a CDMA receiver, receiving a voice transmission, is 30 dB greater than required, due to a remote unit's transmission of the multi-tone signal. Then, after notch filtering, the interference caused by the multi-tone signal would be 0 dB, and appears as the interference due to one additional user.

For an OFDM system, no notch filters are necessary since the tones could be transmitted during the time slots reserved for new users. Alternatively, frequencies could be devoted just for this purpose, or devoted for a certain time slot for this purpose, or shared with the pilot tone functionality.

In an OFDM system, the system and method for reduced time packet transmission in a wireless communications system can provide reduced interference to other OFDM users in adjacent cells.

Figure 8A:
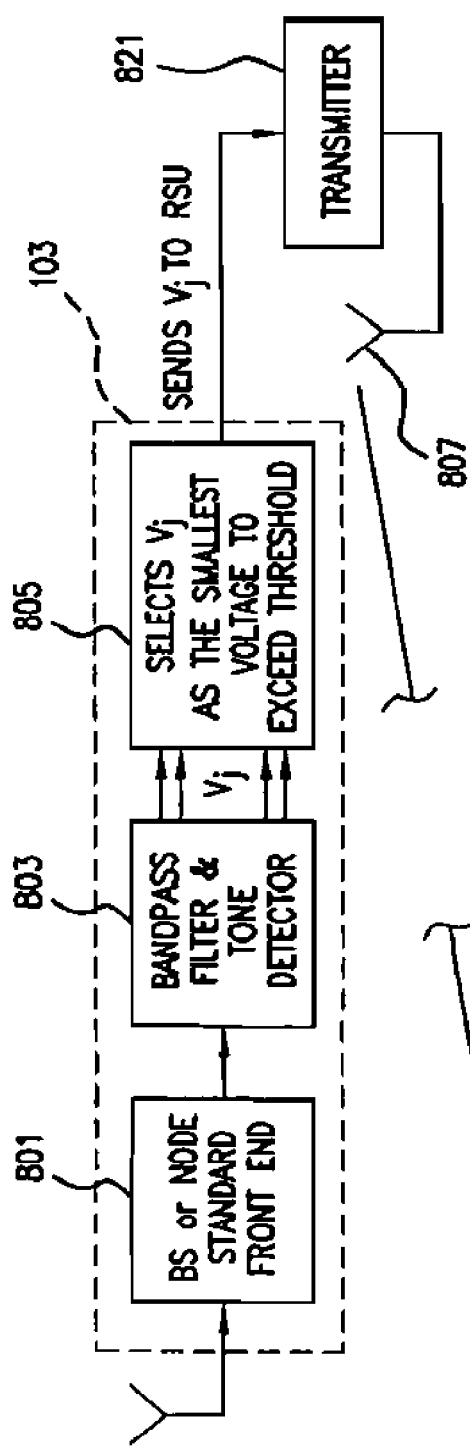
FIG. 8A is a block diagram of a receiver used to receive the multi-tone signals, showing a bandpass filter to suppress the received CDMA or OFDM signals.
Figure 8B:
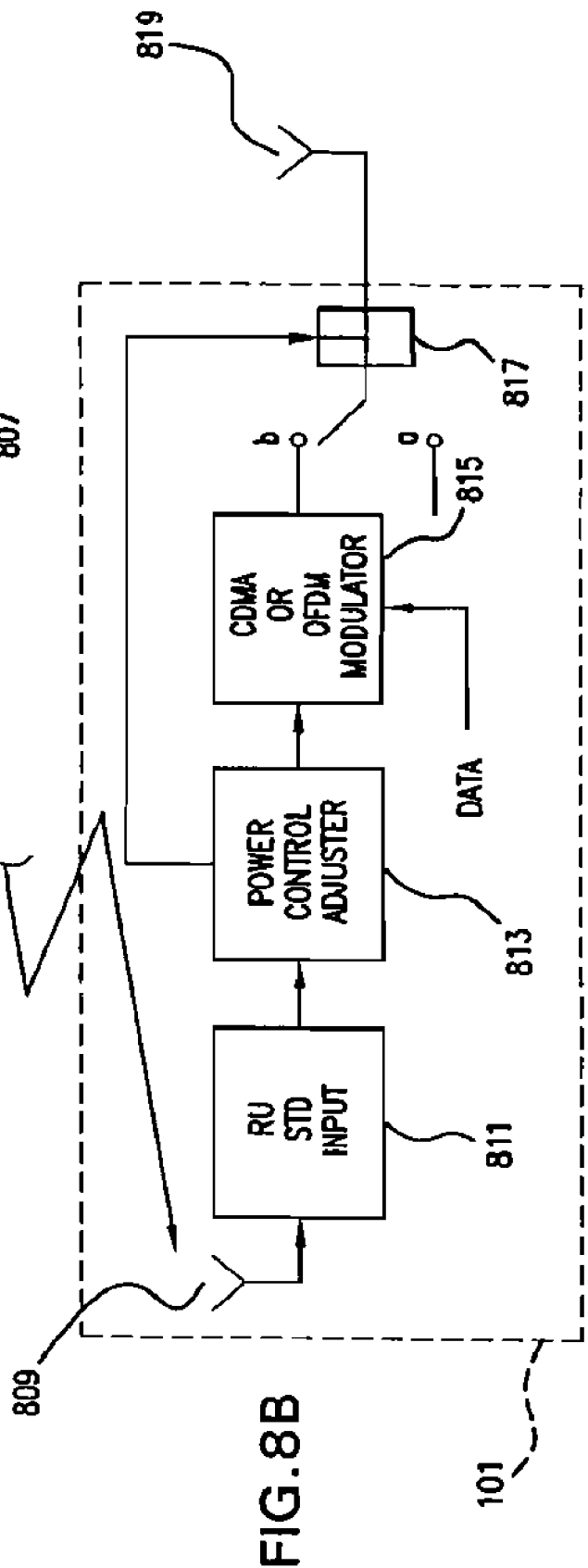
FIG. 8B is a block diagram of a transmitter showing the power control adjustment, according to the invention.

In the portion of the base station 103, shown in FIG. 8A, used to detect the multi-tone signal, bandpass filters, 803, can be used to augment the receiver. These filters can be implemented in numerous ways. These filters receive each of the tones, and remove the other energy of the other spread spectrum signals outside the filter bandwidth, that may be received by the base station 103, simultaneously with the multi-tone power level signal. Also shown in FIG. 8A is the system for selecting the smallest tone that exceeds the threshold. This tone information is then sent to the RU as shown in FIG. 8B. The RU controls the power using a power control adjuster 813, throws the switch to position b, and data is then transmitted at the appropriate level.

Figure 9A:
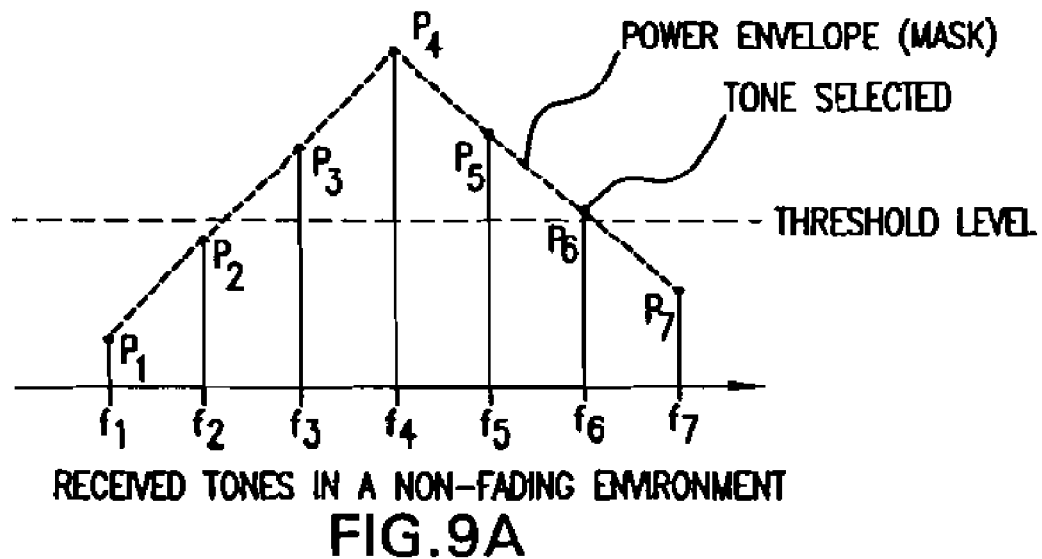
FIG. 9A illustrates received tones, power envelope, and threshold level, in a non-fading environment.
Figure 9B:
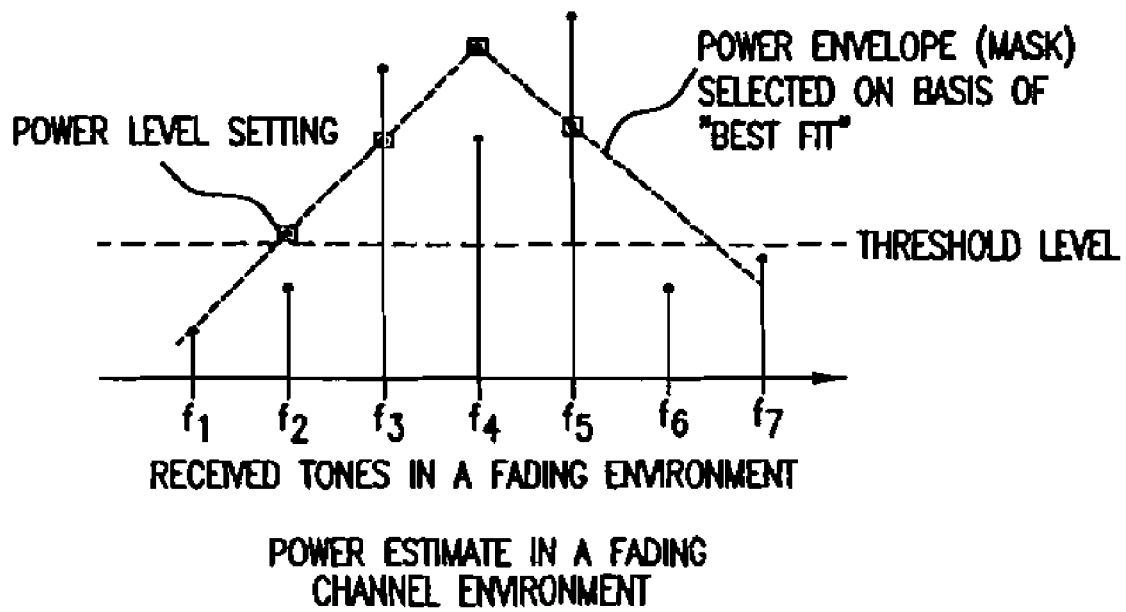
FIG. 9B illustrates received tones, power envelope and threshold level, in a fading environment.

In a wireless system, multipath fading occurs. As a result, the tone selected, tone k, in the above example, may be increased or decreased with respect to its value if there was no fading. Fading can be taken into consideration by noting that the BS knows a priori that the tones differ by 3 dB, and the order of the tones' power settings. Thus, when the BS receives all of the tones, the BS fits a power "mask", depicted in FIG. 9, over the tones and thereby estimates the power and also the proper "tone k". When using the mask, the base station processes the plurality of tones from the received multi-tone packet. The base station then selects, using the mask, a tone from the plurality of tones meeting a desired selection criteria. For example, as shown in FIG. 9B, the mask is above the threshold for frequency f2, while the power level of frequency f2 is below the threshold. This is due to frequency selective fading. With the mask, the power level of frequency f2 is chosen. Without the mask, the power level of frequency f4 would be chosen. Without the mask, at the higher power level of frequency f4, the system is subject to excessive power, and thus interference, from the remote unit. The placement of the mask over the received tones, preferably would be made using a minimum mean square error estimate. Other criteria may be used for placing the mask over the received tones, such as absolute value fit, minimum maximum (mini-max) fit, and other fits known in the art.

Figure 10:
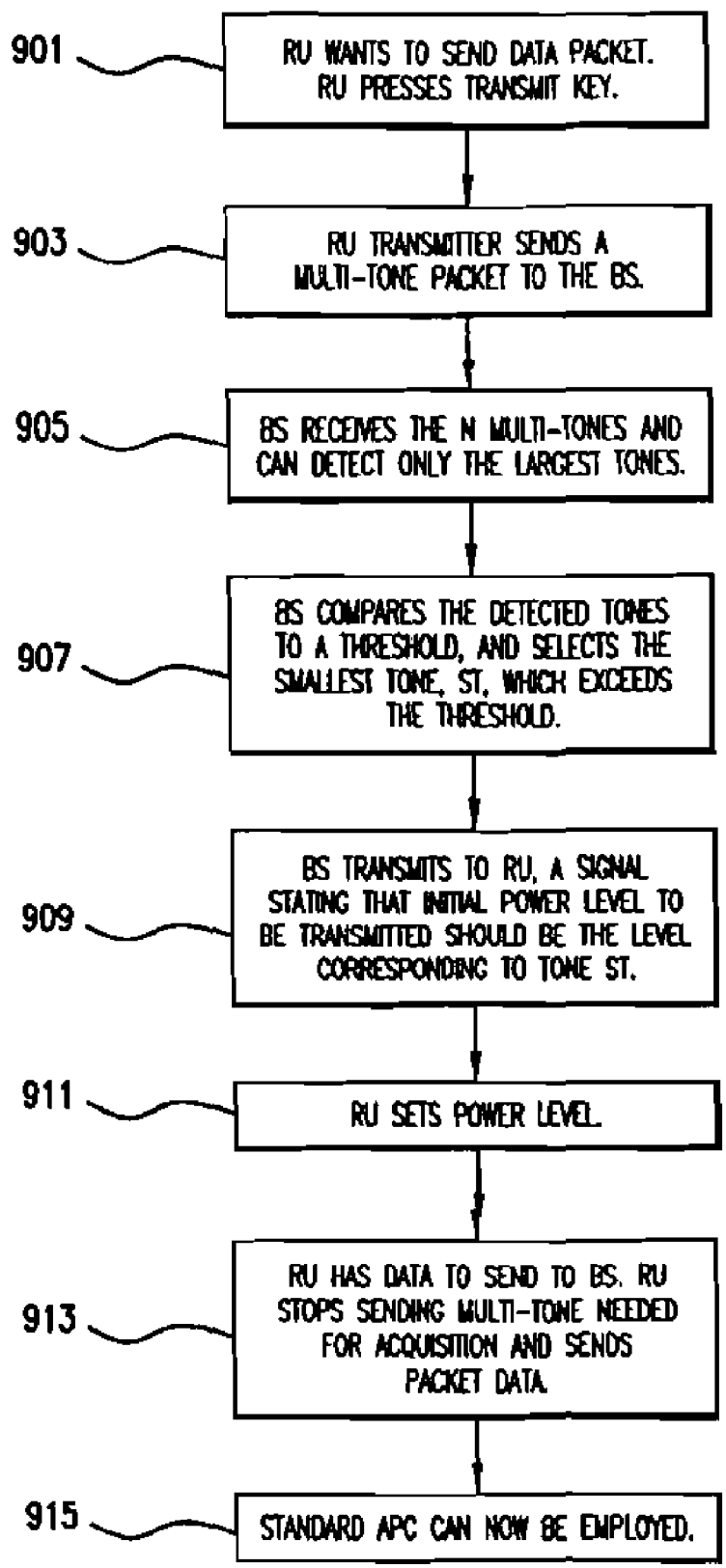
FIG. 10 is a flow chart of the invention.

The present invention also includes a method, as shown in FIG. 10. The method includes the steps, at the remote unit, of "hitting" or "depressing", mechanically or electronically, a transmit key 901, and transmitting 903, using switch position a, a multi-tone packet having a plurality of tones, to the base station. Each tone in the plurality of tones has a different power level and at a different frequency, from other tones in the plurality of tones. The steps include receiving 905 by a receiver front end 801, at the base station, the multi-tone packet, filtering in the bandpass filter and tone detector 803 and comparing 907 a voltage to a threshold in threshold detector 805 the plurality of tones from the received multi-tone packet to a threshold. The steps include selecting 907, by selector 805, from the plurality of tones, a tone meeting a desired selection criteria. Using the selected tone, the base station then transmits 909 by transmitter 807 a BS packet to the remote unit. The BS packet has power information from the power level of the selected tone.

The steps include receiving, at the remote unit 811, the BS packet, and using the power information, setting 911 by power control adjuster 813 a RU power level. The remote unit transmits 913 using modulator 815 and transmitter 817, using switch position, b, a plurality of packets, at the RU power level. After adjusting the remote unit power level, standard APC is employed 915 to maintain appropriate power level.

Figure 11:
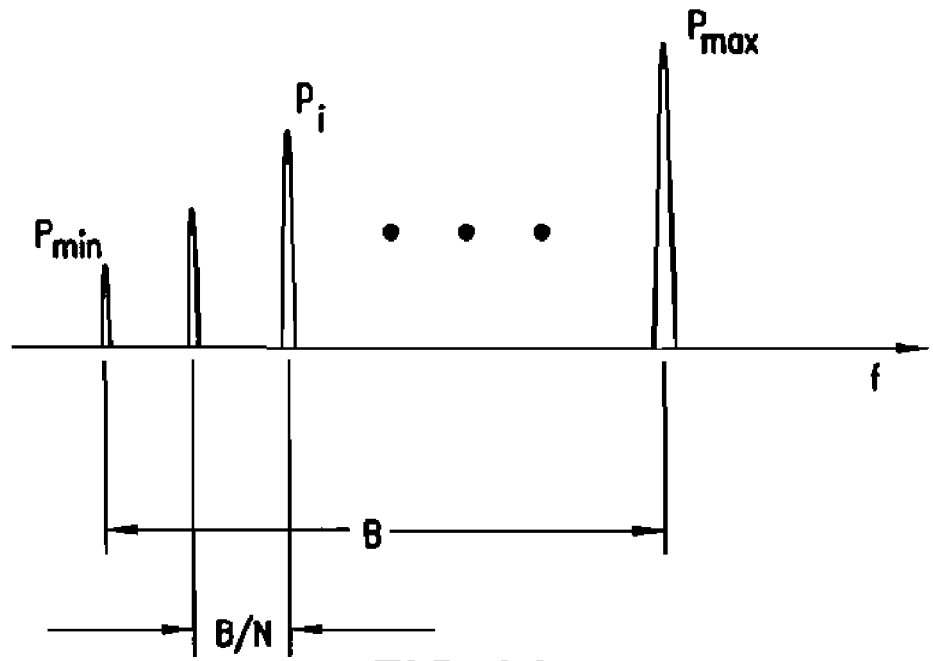
FIG. 11 illustrates the invention with the tones carrying information.
Figure 12:
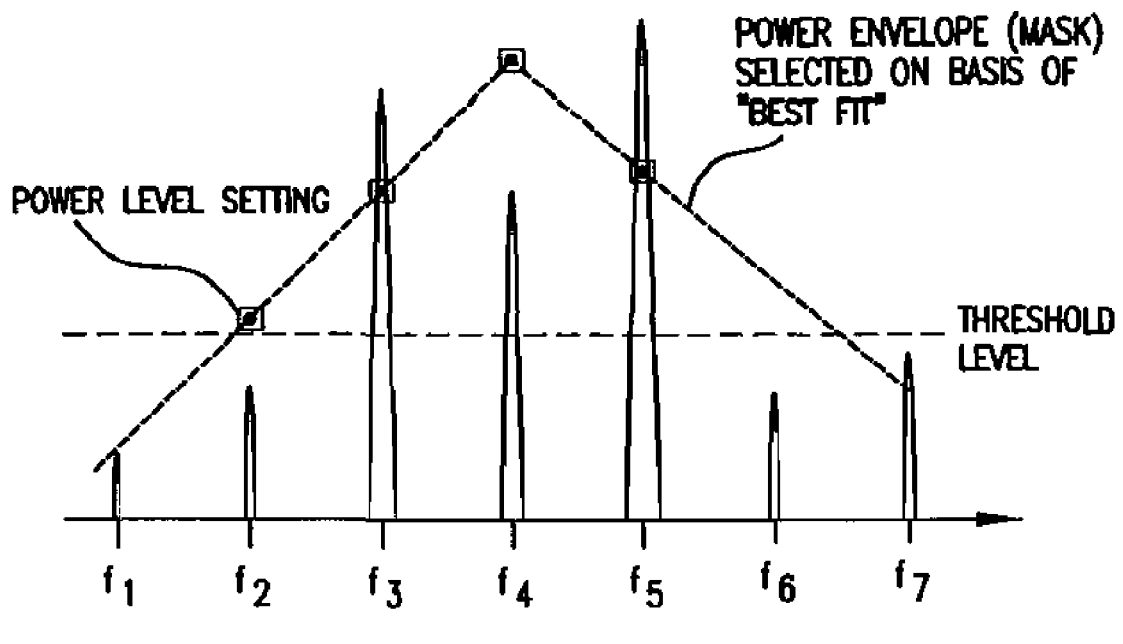
FIG. 12 illustrates received tones with information, power envelope and threshold level, in a fading environment.

The invention may me extended to modulating the tones with information. As shown in FIG. 11, in place of the spaced tones of FIG. 3, information is sent on each tone. FIG. 12 shows an example of tones with information, and the power envelope and threshold level, in a fading environment, similar to that of FIG. 9B. These figures illustrates, by example, for the system and method, transmitting the multi-tone packet having the plurality of tones with each tone modulated with specific information. The bandwidth of this information is small compare to the spacing between tones in the preferred design, to insure that the base station can notch out the energy in the modulation. The base station can respond to the remote station having the specific information.

It will be apparent to those skilled in the art that various modifications can be made to the reduced time packet transmission in a wireless communications system of the instant invention without departing from the scope or spirit of the invention, and it is intended that the present invention cover modifications and variations of the reduced time packet transmission in a wireless communications system, provided they come within the scope of the appended claims and their equivalents.

We claim:

1. A power control method, comprising the steps of:
    transmitting from a remote unit, a multi-tone packet having a plurality of tones with each tone having a different power level and at a different frequency, from other tones in the plurality of tones;
    receiving, at a base station, the multi-tone packet;
    processing, at the base station, the plurality of tones from the received multi-tone packet to generate a mask placement; selecting, using the mask, a tone from the plurality of tones meeting a desired selection criteria;
    transmitting, responsive to the selected tone, a BS packet from the base station, with the BS packet having power information from the power level of the mask at the selected tone; receiving, at the remote unit, the BS packet;
    setting, at the remote unit, responsive to the power information, a RU power level;
    and transmitting, from the remote unit, a plurality of packets, with the RU power level.

2. The power control method, as set forth in claim 1, with the step of transmitting, from the remote unit, including the step of transmitting the multi-tone packet with the plurality of tones increasing in power with in creasing frequency.

3. The power control method, as set forth in claim 1, with the step of transmitting, from the remote unit, including the step of transmitting the multi-tone packet with the plurality of tones decreasing in power with increasing frequency.

4. The power control method, as set forth in claim 1, with the step of transmitting, from the remote unit, including the step of transmitting the multi-tone packet with the plurality of tones increasing and subsequently decreasing in power with increasing frequency, thereby forming a triangular shape.

5. The power control method, as set forth in claim 1, with the step of transmitting, from the remote unit, including the step of transmitting the multi-tone packet with the plurality of tones increasing in power with increasing frequency, and in a subsequent packet, decreasing in power with increasing frequency.

6. The power control method, as set forth in claim 1, with the step of transmitting, from the remote unit, including the step of transmitting the multi-tone packet with the plurality of tones having non uniform spacing in frequency.

7. The power control method, as set forth in claim 1, with the step of selecting including the step of selecting a tone from a mask using a minimum mean square error.

8. The power control method, as set forth in claim 1, with the step of selecting including the step of selecting a tone from a mask using a criteria other than a minimum mean square error.

9. A power control system, comprising:
a remote unit for transmitting a multi-tone packet having a plurality of tones with each tone having a different power level and at a different frequency, from other tones in the plurality of tones;
a base station for receiving the multi-tone packet, for processing the plurality of tones from the received multi-tone packet to generate a mask, and for selecting, using the mask, a tone from the plurality of tones meeting a desired selection criteria;
the base station for transmitting, responsive to the selected tone, a BS packet, with the BS packet having power information from the power level of the mask at the selected tone;
the remote unit for receiving the BS packet, setting responsive to the power information, a RU power level, and for transmitting a plurality of packets, with the RU power level.

10. The power control system, as set forth in claim 9, with the remote unit transmitting the multi-tone packet with the plurality of tones increasing in power with increasing frequency.

11. The power control system, as set forth in claim 9, with the remote unit transmitting the multi-tone packet with the plurality of tones decreasing in power with increasing frequency.

12. The power control system, as set forth in claim 9, with the remote unit transmitting the multi-tone packet with the plurality of tones increasing and subsequently decreasing in power with increasing frequency, thereby forming a triangular shape.

13. The power control system, as set forth in claim 9, with the remote unit transmitting the mutt-tone packet with the plurality of tones increasing in power with increasing frequency, and in a subsequent packet, decreasing in power with increasing frequency.

14. The power control system, as set forth in claim 9, with the base station selecting a tone from a mask using a minimum mean square error.

15. The power control system as set forth in claim 9, with the remote unit for transmitting the multi-tone packet having the plurality of tones with each tone modulated with specific information.

16. The power control system as set forth in claim 9, with the remote unit for transmitting the multi-tone packet having the plurality of tones with each tone modulated with specific information, with the base station responding to timing settings of the remote station having the specific information.

17. A power control system, comprising:
remote-unit means for transmitting a multi-tone packet having a plurality of tones with each tone having a different power level and at a different frequency, from other tones in the plurality of tones;
base-station means for receiving the multi-tone packet, for processing the plurality of tones from the received multi-tone packet to generate a mask, and for selecting, using the mask, a tone from the plurality of tones meeting a desired selection criteria;
the base-station means for transmitting, responsive to the selected tone, a BS packet, with the BS packet having power information from the power level of the mask at the selected tone;
the remote-unit means for receiving the BS packet, setting responsive to the power information, a RU power level, and for transmitting a plurality of packets, with the RU power level.

18. The power control system, as set forth in claim 17, with the remote-unit means for transmitting the multi-tone packet with the plurality of tones increasing in power with increasing frequency.

19. The power control system, as set forth in claim 17, with the remote-unit means for transmitting the multi-tone packet with the plurality of tones decreasing in power with increasing frequency.

20. The power control system, as set forth in claim 17, with the remote-unit means for transmitting the multi-tone packet with the plurality of tones increasing and subsequently decreasing in power with increasing frequency, thereby forming a triangular shape.

21. The power control system, as set forth in claim 17, with the remote-unit means for transmitting the multi-tone packet with the plurality of tones increasing in power with increasing frequency, and in a subsequent packet, decreasing in power with increasing frequency.

22. The power control system, as set forth in claim 17, with the base-station means for selecting a tone from a mask using a minimum mean square error.

23. The power control system, as set forth in claim 17, with the base-station means for selecting a tone from a mask using a criteria other than minimum mean square error.

24. The power control system as set forth in claim 17, with the remote-unit means for transmitting the multi-tone packet having the plurality of tones with each tone modulated with specific information.

25. The power control system as set forth in claim 17, with the remote-unit means for transmitting the multi-tone packet having the plurality of tones with each tone modulated with specific information, with the base-station means responding to timing settings of the remote station having the specific information.

* * * * *